US012807485B2

(12) United States Patent
Hwang et al.

(10) Patent No.: US 12,807,485 B2
(45) Date of Patent: Nov. 24, 2026

(54) GENERATION OF HYDROGEN BY THERMAL HYDROLYSIS OF SODIUM BOROHYDRIDES

(71) Applicant: University of Kentucky Research Foundation, Lexington, KY (US)

(72) Inventors: Hyun-Tae Hwang, Lexington, KY (US); Geo-Jong Kim, Lexingon, KY (US)

(73) Assignee: University of Kentucky Research Foundation, Lexington, KY (US)

(*) Notice: Subject to any disclaimer, the term of this patent is extended or adjusted under 35 U.S.C. 154(b) by 662 days.

(21) Appl. No.: 18/040,967

(22) PCT Filed: Aug. 25, 2021

(86) PCT No.: PCT/US2021/047599
§ 371 (c)(1),
(2) Date: Feb. 7, 2023

(87) PCT Pub. No.: WO2022/051150
PCT Pub. Date: Mar. 10, 2022

(65) Prior Publication Data
US 2023/0271828 A1 Aug. 31, 2023

Related U.S. Application Data

(60) Provisional application No. 63/074,160, filed on Sep. 3, 2020.

(51) Int. Cl.
*C01B 3/065* (2026.01)
*F17C 11/00* (2006.01)

(52) U.S. Cl.
CPC ............ *C01B 3/065* (2013.01); *F17C 11/005* (2013.01)

(58) Field of Classification Search
CPC ......... C01B 3/065; F17C 11/005; Y02E 60/36
See application file for complete search history.

(56) References Cited

U.S. PATENT DOCUMENTS

| | | | |
|---|---|---|---|
| 8,771,634 B1 | 7/2014 | Becker et al. | |
| 2004/0033194 A1 | 2/2004 | Amendola et al. | |
| 2006/0042162 A1 | 3/2006 | Goldstein et al. | |
| 2006/0257313 A1* | 11/2006 | Cisar | B01J 8/009 422/198 |
| 2011/0020215 A1 | 1/2011 | Ryu et al. | |

FOREIGN PATENT DOCUMENTS

CN 109941964 A * 6/2019

OTHER PUBLICATIONS

Machine Translation of CN109941964A; Jun. 28, 2019 (Year: 2019).*
Balbay, et al., Hydrogen Production from Sodium Borohydride in Boric Acid-water Mixtures, Energy Sources, Part A, 36, 2014, pp. 1166-1174.

* cited by examiner

*Primary Examiner* — Coris Fung
(74) *Attorney, Agent, or Firm* — Stites & Harbison PLLC; Warren D. Schickli

(57) ABSTRACT

A solid state formulation adapted for hydrogen generation includes a mixture of sodium borohydride and a water storage agent that is stable below about 60° C. but adapted to release water upon heating to a temperature between about 80° C. and about 300° C. A method for generating hydrogen by heating that solid state formulation is also provided.

9 Claims, 12 Drawing Sheets

$$B(OH_3) \longrightarrow BHO_2 + H_2O \ (150°C)$$

$$BHO_2 \longrightarrow \frac{1}{2}B_2O_3 + \frac{1}{2}H_2O \ (200°C)$$

$$4NaBH_4 + 4H_2O \longrightarrow 4NaB(OH)_4 + 4H_2$$

GENERATION OF HYDROGEN BY THERMAL HYDROLYSIS OF SODIUM BOROHYDRIDES

RELATED APPLICATION

This application is a § 371 National State Application of PCT/US2021/047599 filed Aug. 25, 2021 which claims priority to U.S. Provisional Patent Application Ser. No. 63/074,160 filed on Sep. 3, 2020, which are hereby incorporated by reference in its entirety.

TECHNICAL FIELD

This document relates generally to hydrogen storage and delivery technology and, more particularly, to a solid state formulation adapted for hydrogen generation as well as to a method of generating hydrogen using that formulation.

BACKGROUND

As the world population and economy have grown, environmental pollution has surged due to an increase in fossil fuel use. As a result, many countries have set targets for carbon neutrality and are looking for new energy sources to replace fossil fuels. In this context, hydrogen has received a great deal of attention as a sustainable and alternative energy source because it is a clean fuel or energy that produces only water when it reacts with oxygen in a fuel cell.

Sodium borohydride (SBH, NaBH4) is a safe and attractive hydrogen storage material due to its high hydrogen content (10.6 wt %) and $H_2$ release at mild conditions in the presence of water. In the past, hydrogen has been released from SBH by either hydrolysis or thermolysis. Due to limited solubility of SBH in water, hydrolysis provides low $H_2$ yield (<5%) and it also requires catalysts.

$$NaBH_4+2H_2O \rightarrow NaBO_2+4H_2 \quad \text{(Eq. 1)}$$

Since hydrolysis of SBH requires a large amount of water, it is difficult to avoid serious system $H_2$ (gravimetric and volumetric) yield drop due to the associated components such as tank, water pump, valves, piping, and so on. As compared to hydrolysis, the overall system for thermolysis is much simpler because such components mentioned above are not needed. However, thermolysis of SBH requires exceptionally high temperature (>500 C) to release an acceptable amount of $H_2$.

$$NaBH_4 \rightarrow Na+B+2H_2 \quad \text{(Eq. 2)}$$

The two different $H_2$ generation methods from SBH mentioned above each have pros and cons. In this context, from both the fundamental and application viewpoints, the following challenges remain.

(1) How to decrease thermolysis onset (operating) temperatures to below 200 C?

(2) How to improve both gravimetric and volumetric $H_2$ capacities or yields?

(3) How to generate $H_2$ in the absence of water?

Toward this end, this document relates to a new and improved solid state formulation adapted for hydrogen generation as well as to a method of generating hydrogen using that formulation. The new method to generate hydrogen by thermal hydrolysis of sodium borohydride addresses these challenges by using solid state reactants to obtain high hydrogen yield at temperatures below about 150° C., along with relatively rapid kinetics without the use of a catalyst.

Thus, the new and improved solid state formulation and method represent a significant advance in the art of hydrogen storage and delivery.

SUMMARY

In accordance with the benefits and advantages set forth herein, a new and improved solid state formulation is provided for hydrogen storage and generation. That solid state formulation comprises, consists of or consists essentially of a mixture of sodium borohydride and a water storage agent that is stable at temperatures below about 60° C. but adapted to release water upon heating to a temperature between about 80° C. and about 300° C. In some embodiments, the heating range to release water and generate hydrogen is between about 80° C. and about 250° C. In some embodiments, the heating range to release water and generate hydrogen is between about 80° C. and about 200° C. In still other, more preferred embodiments, the heating range to release water and generate hydrogen is between about 80° C. and about 150° C.

In some of the many possible embodiments of the solid state formulation, the molar ratio of sodium borohydride to water storage agent is between about 1:1 and about 1:10. In still other possible embodiments, the molar ratio of sodium borohydride to water storage agent is between about 1:1 and about 1:5.

In one or more of the many possible embodiments of the solid state formulation, the water storage agent is selected from a group of agents consisting of boric acid, a hydrated inorganic compound, a water absorbent and combinations thereof.

Examples of hydrated inorganic compounds that are useful as water storage agents include, beryllium sulfate tetrahydrate ($BeSO_4$-$4H_2O$), sodium metaborate tetrahydrate ($NaBO_4$-$4H_2O$) and combinations thereof.

A new and improved method of generating hydrogen comprises, consists of or consists essentially of the step of heating a mixture of sodium borohydride and a water storage agent, that is stable below about 60° C., to a temperature of between about 80° C. and about 300° C. to release water from the water storage agent and generate hydrogen.

In some embodiments, the heating range to release water and generate hydrogen is between about 80° C. and about 250° C. In some embodiments, the heating range to release water and generate hydrogen is between about 80° C. and about 200° C. In still other, more preferred embodiments, the heating range to release water and generate hydrogen is between about 80° C. and about 150° C.

The method may also include the step of using boric acid, a hydrated inorganic compound, a water absorbent and combinations thereof as the water storage agent. Hydrated inorganic compounds and water absorbents useful in the present method are identified elsewhere in this document.

In accordance with yet another aspect, a new and improved method of generating hydrogen, comprises, consists of or consists essentially of the step of heating a solid state formulation, including sodium borohydride, to a temperature of between about 80° C. and about 150° C. to generate a hydrogen yield of between about 10 wt % and about 13 wt %.

That solid state formulation may further include a water storage agent and the solid state formulation may have a molar ratio of sodium borohydride to water storage agent of between about 1:1 and about 1:5. In one particularly useful embodiment, the water storage agent is boric acid.

In accordance with one more aspect, a method of generating hydrogen by thermal hydrolysis, comprises heating a mixture of sodium borohydride and boric acid to a temperature between about 80° C. and about 200° C.

In the following description, there are shown and described several preferred embodiments of the solid state formulation and the related method of generating hydrogen by heating that solid state formulation. As it should be realized, the solid state formulation and the related method are capable of other, different embodiments and their several details are capable of modification in various, obvious aspects all without departing from the solid state formulation and the related method as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the patent specification, illustrate several aspects of the solid state formulation and the related method of generating hydrogen by heating that solid state formulation and together with the description serve to explain certain principles thereof.

Figure 1:
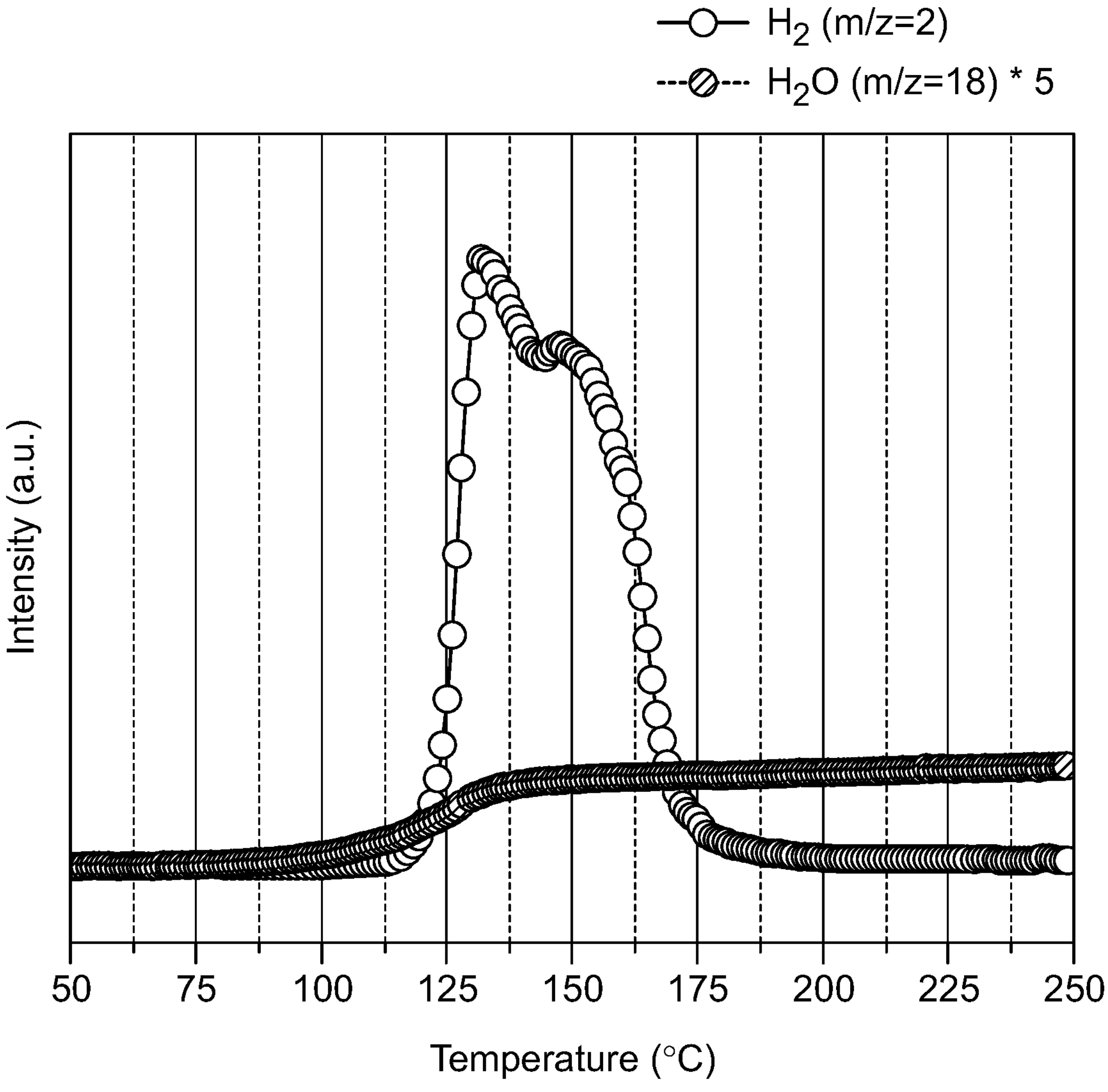
FIG. 1 is a graph depicting the transient analysis of gaseous products (SBH:BA=1:2) at $T_{SP}$=250° C.

Reference will now be made in detail to the present preferred embodiments of the solid state formulation and the related method of generating hydrogen by heating that solid state formulation, examples of which are illustrated in the accompanying drawing figures.

DETAILED DESCRIPTION

A solid state formulation adapted for hydrogen generation by thermal hydrolysis includes sodium borohydride (SBH, NaBH4) and a water storage agent. The sodium borohydride functions as a hydrogen storage material while the water storage agent functions to store water. Significantly, below about 60° C., the solid state mixture of sodium borohydride and water storage agent is stable. However, upon heating to a temperature greater than about 80° C., the water storage agent releases water. That water supports hydrogen generation from the sodium borohydride at milder heating conditions than the 500° C. generally associated with thermal hydrolysis of sodium borohydride. Those milder conditions may be as low as between about 80° C. and about 300° C. In some embodiments, the temperature range required to release water and generate hydrogen from the solid state formulation is between about 80° C. and about 250° C. In still other embodiments, the temperature range required to release water and generate hydrogen from the solid state formulation is between about 80° C. and about 200° C. In still other embodiments, the temperature range required to release water and generate hydrogen from the solid state formulation is between about 80° C. and about 150° C.

The molar ratio of sodium borohydride to water storage agent may be between about 1:1 and about 1:10. In some embodiments, the molar ratio may be between about 1:1 and about 1:5.

A wide range of water storage agents are useful in the solid state formulation. Preferably, the water storage agents are fully stable and retain water below about 60° C. but upon heating to a temperature above about 80° C. release that water.

Boric acid is particularly useful as boric acid is stable below 80° C. and does not release water that would support sodium borohydride hydrolysis. Thus, a mixture of sodium borohydride and boric acid in the solid phase is safe under normal conditions below 80° C. However, upon heating to relatively mild temperatures above 80° C., boric acid is dehydrated to form metaboric acid ($HBO_2$) which can be further dehydrated to form boron trioxide ($B_2O_3$). Using boric acid as the water storage agent, it is possible to obtain approximately $4H_2$ equivalents with rapid kinetics at 150° C. to support the generation of hydrogen from the sodium borohydride.

Other useful water storage agents include, but are not necessarily limited to, hydrated inorganic compounds, water absorbents and combinations thereof with and without boric acid.

Hydrated inorganic compounds useful in the solid state formulation include, but are not necessarily limited to, beryllium sulfate tetrahydrate ($BeSO_4$-$4H_2O$), sodium metaborate tetrahydrate ($NaBO_4$-$4H_2O$) and combinations thereof.

The method of generating hydrogen includes the step of heating a mixture of sodium borohydride and a water storage agent to a temperature of between about 80° C. and about 300° C. to release water from the water storage agent and generate hydrogen from the sodium borohydride. Where the sodium borohydride and water storage agent are initially held in separate containers or compartments of the same container, the method may also include the step of mixing the sodium borohydride and the water storage agent together. Mixing may be done by any appropriate means in order to provide a substantially homogenous mixture. For example, the sodium borohydride and the water storage agent may be mixed in a vortex mixer for a sufficient time to obtain the desired homogeneity.

The solid state formulations of the mixture of sodium borohydride and water storage agent are fully stable below about 60° C. and can be stored safely under normal conditions. Upon heating to a temperature above about 80° C., water is released from the water storage agent to support hydrolysis of the sodium borohydride and the production of hydrogen. Thus, for example, the method may include the step of heating to a temperature range of about 80° C. and about 250° C. to release water from the water storage agent and generate hydrogen from the sodium borohydride. For still other solid state formulations, the method may include the step of heating to a temperature range of about 80° C. and about 200° C. to release water from the water storage agent and generate hydrogen from the sodium borohydride. For still other solid state formulations, such as those using boric acid as the water storage agent, the method may include the step of heating to a temperature range of about 80° C. and about 150° C. to release water from the water storage agent and generate hydrogen from the sodium borohydride.

The method may also include the step of using (a) boric acid, (b) hydrated inorganic compounds that are stable below about 60° C. but release water when heated above about 80° C., (c) water absorbents that are stable below about 60° C. but release water when heated above about 80° C. and (d) any combinations thereof as the water release agent.

In some embodiments, the method includes the step of heating a solid state formulation, including sodium borohydride, to a temperature of between about 80° C. and about 150° C. to generate a hydrogen yield of between about 10 wt % and about 13 wt %. Such a solid state formulation may include boric acid as a water storage agent for the release of water at a temperature as low as 135° C. and for the supplemental release of hydrogen as the boric acid decomposes. The molar ratio of sodium borohydride to water storage agent may be on the order of between about 1:1 to 1:10 or, in some embodiments on the order of between about 1:1 to 1:5.

EXPERIMENTAL

The experiments were conducted in a stainless-steel reactor (Parr Instrument Company, Series 5000). Using a vortex mixer, the samples were prepared by mixing sodium borohydride (>98% pure NaBH4, SBH, Sigma-Aldrich) with boric acid (99.9995% pure, $B(OH)_3$, BA, Alfa Aesar) in varying molar ratios. In addition, all the manipulations were carried out in an argon-filled glove box to avoid contact with moisture in air. The reactor was heated at a constant heating rate from ambient temperature to the set point temperature ($T_{SP}$). Along with the reactor pressure, the reactor ($T_R$) and sample ($T_S$) temperatures were collected with time. After reaching the target (set point) temperature, the reactor was maintained for 30 min and then cooled down to the ambient temperature. Detailed information on procedures and experimental set-up can be found in our prior work. In this study, the $H_2$ equivalent and overall yield are defined as follows:

$$H_2 \text{ equivalent} = \frac{H_2(\text{mol})}{SBH(\text{mol})} \quad \text{(Eq. 3)}$$

$$\text{Overall } H_2 \text{ yield (wt. \%)} = \frac{H_2(\text{g})}{SBH(\text{g}) + BA(\text{g})} \times 100 \quad \text{(Eq. 4)}$$

$$H_2 \text{ yield based on } SBH \text{ (wt. \%)} = \frac{H_2(\text{g})}{SBH(\text{g})} \times 100 \quad \text{(Eq. 5)}$$

To identify gaseous products the transient analysis was performed using the temperature-programmed reaction with mass-spectrometry (TPR/MS). The reactor was operated in a continuous mode where a fixed volumetric flow of Ar was injected using a mass flow controller into the reactor. Before the analysis, the reactor was purged with Ar for 10 min at room temperature. With heating the reactor up to 250° C. at 2° C./min, gases produced by reaction were analyzed using a quadrupole mass-spectrometer (Stanford Research Systems, QMS 422).

Thermogravimetric analysis (TA Instruments, Q500) was carried out under Ar flow to understand thermal stability of both neat SBH and BA. During this analysis, temperature was increased to 250° C. at heating rate 2° C./min.

The $^{11}B$ solid-state NMR spectra were obtained using a Varian Unity Inova 300 MHz spectrometer (7.05 T), operating at a resonance frequency of $v_0$ ($^{11}B$)=96.3 MHz at room temperature. A Varian/Chemagnetics 4 mm double-resonance APEX HX magic-angle spinning (MAS) probe was used for all MAS experiments under a spinning rate of 10 kHz. The samples were packed into 4 mm OD standard zirconia rotors. Experimental boron chemical shift referencing, pulse calibration, and setup were done using powdered sodium borohydride (NaBH4), which has a chemical shift of −42.06 ppm relative to the primary standard, neat liquid $BF_3 \cdot OEt_2$ at 0.0 ppm. Finally, the NMR spectra were processed using MestReNova processing software.

The in-situ DRIFTS (Diffuse Reflection Infared spectroscopy) analysis was conducted using an FT-IR spectrometer (Nicolet IS 20, Thermo Fisher Scientific) with a diffuse reflectance (DR) 400 accessory. The spectrum was obtained via 30 cumulative scans with a resolution (4 $cm^{-1}$) using a deuterated triglycine sulfate (dTGS) detector.

A. Results and Discussion

1. Transient and Thermogravimetric Study

A temperature-programmed reaction with mass-spectrometry (TPR/MS) was conducted to identify the gaseous products by thermal hydrolysis of SBH. With increasing the reactor to 250° C. at a heating rate of 2° C./min, a fixed volumetric flow of Ar was introduced to the reactor and gaseous products exiting the reactor were analyzed using a mass-spectrometer. FIG. 1 shows the profiles of hydrogen and water released from the SBH-BA mixture as a function of reactor.

temperature. As shown in FIG. 1, $H_2O$ is released first at −100° C., followed by Hz. It is expected that $H_2$ was produced by hydrolysis with water released from BA. Two distinct hydrogen peaks were observed between 110 and 175° C., indicating that there are different dehydrogenation steps in the temperature range investigated. No detectable gases other than hydrogen and water were observed from the MS profiles.

Figure 2A:
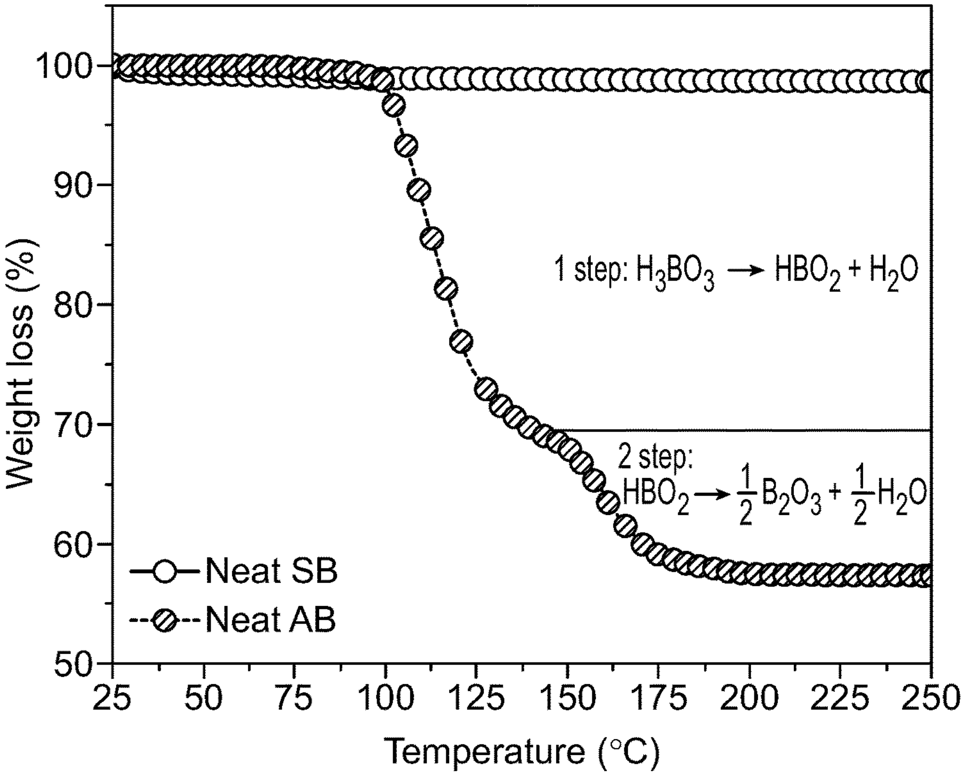
FIG. 2 is a graph depicting (a) the thermogravimetric analysis of neat SBH and neat BA, and (b) MS for neat BA.
Figure 2B:
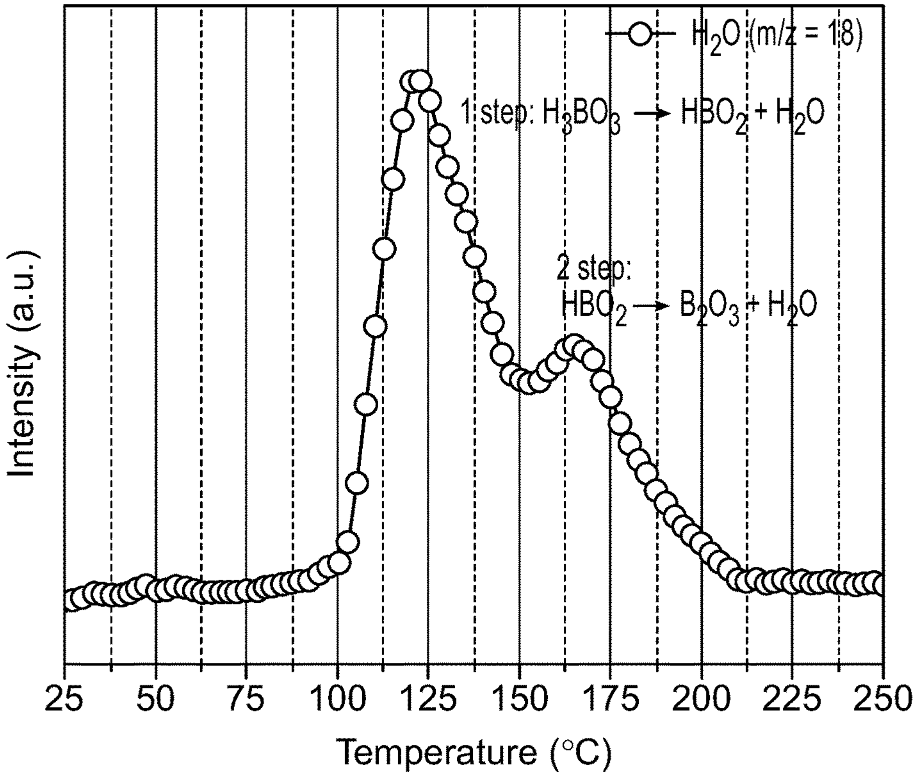

The thermogravimetric (TG) analysis of neat SBH and BA was carried out to better understand the dehydrogenation mechanism. As shown in FIG. 2(*a*), almost no weight loss was observed for neat SBH up to 250° C. It is well known that thermal decomposition of SBH (Eq. 1) occurs at near 500° C. On the other hand, BA started to decompose at −100° C. and continued to 200° C. The weight losses of BA were proceeded through two distinct stages. The first stage is attributed to the dehydration of BA to metaboric acid ($HBO_2$) (Eq. 6), which is further dehydrated to boron oxide ($B_2O_3$) in the next stage (Eq. 7). The weight losses for the first and second stages were calculated to be ~29 and ~15 wt %, respectively.

$$H_3BO_3 \rightarrow HBO_2 + H_2O \quad \text{(Eq. 6)}$$

$$2HBO_2 \rightarrow B_2O_3 + H_2O \quad \text{(Eq. 7)}$$

Apart from the thermogravimetric analysis, the transient MS analysis was performed for neat BA. FIG. 2(*b*) clearly confirms that the weight losses observed from the TG analysis are attributed to dehydration of BA. Interestingly, the profiles of water released from BA in FIG. 2(*b*) is similar to that of $H_2$ produced by hydrolysis of SBH-BA mixture (FIG. 1), suggesting that the hydrogen release kinetics by SBH hydrolysis is greatly influenced by dehydration rate of BA. Based on the results from FIGS. 1 and 2, it is likely that hydrogen is generated by hydrolysis of SBH with water produced by thermal decomposition of BA.

2. Hydrogen Release Kinetics

Figure 3:
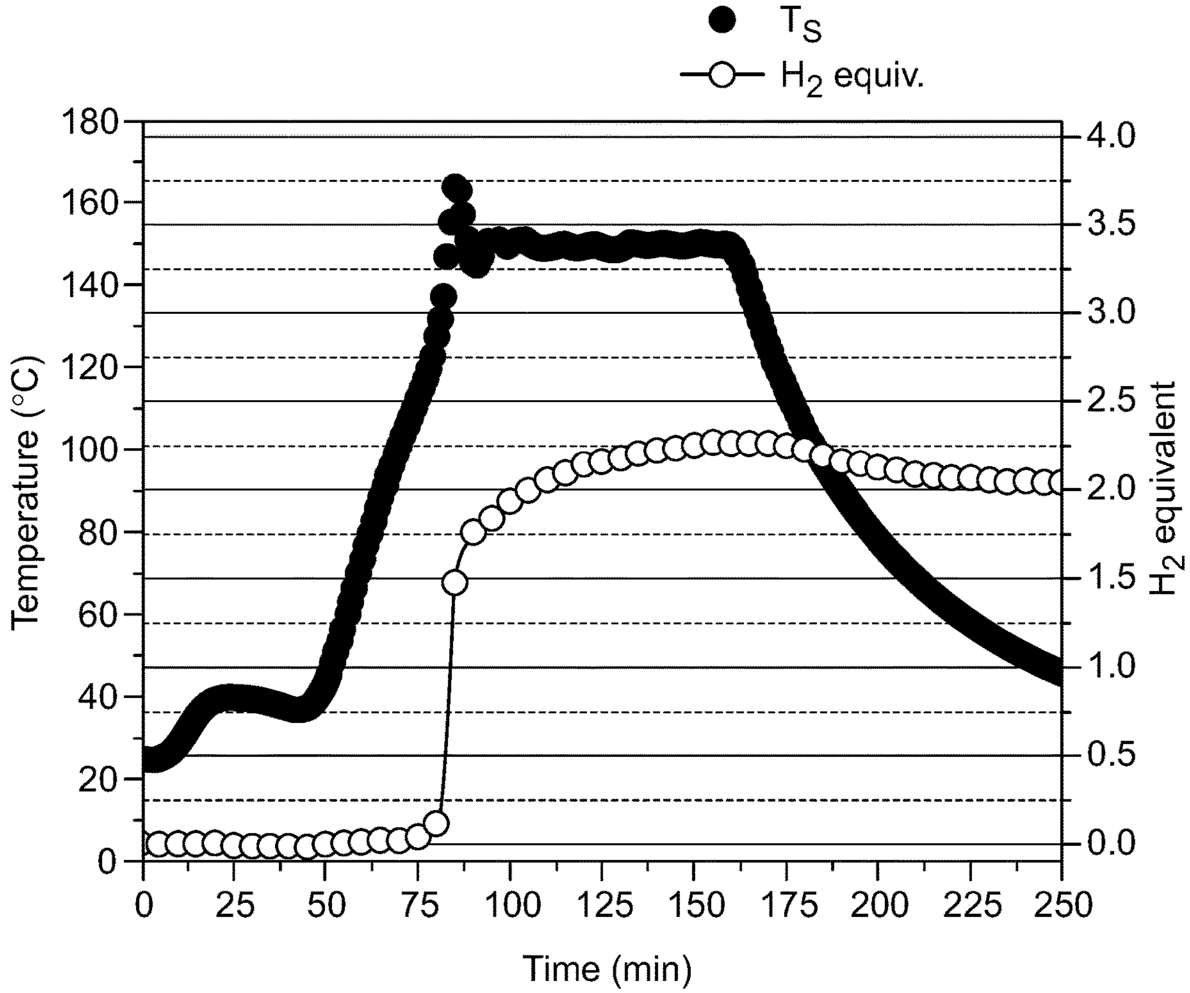
FIG. 3 is a graph illustrating temperature and $H_2$ equivalent profiles for SBH:BA=1:2 at $T_{SP}$=150° C.

To investigate hydrogen release kinetics from SBH with BA, experiments were conducted in a stainless-steel batch reactor with external heating. FIG. 3 shows the typical profiles of sample temperature and overall Hz equivalent (Eq. 3) for dehydrogenation of SBH:BA=1:2 at 150° C. Hydrogen began to release at –100° C. and was sharply evolved at –120° C. After the sharp evolution, hydrogen gradually evolved with time and –2$H_2$ equivalents were finally achieved. It can be inferred that 2 moles of $H_2$ were generated by hydrolysis between 1 mole of SBH and 2 moles of water dehydrated from BA, which is in good agreement with the results from the TG analysis of BA (FIG. 2(*a*)) and Eq. 3. It is well known that hydrolysis of SBH is exothermic (Eq. 2), while thermolysis is endothermic (Eq. 1). As shown in FIG. 2, the sample temperature rapidly increased up to 165° C. during the sharp $H_2$ evolution, which verifies that hydrogen from the SBH-BA mixture was produced by exothermic hydrolysis of SBH.

Figure 4:
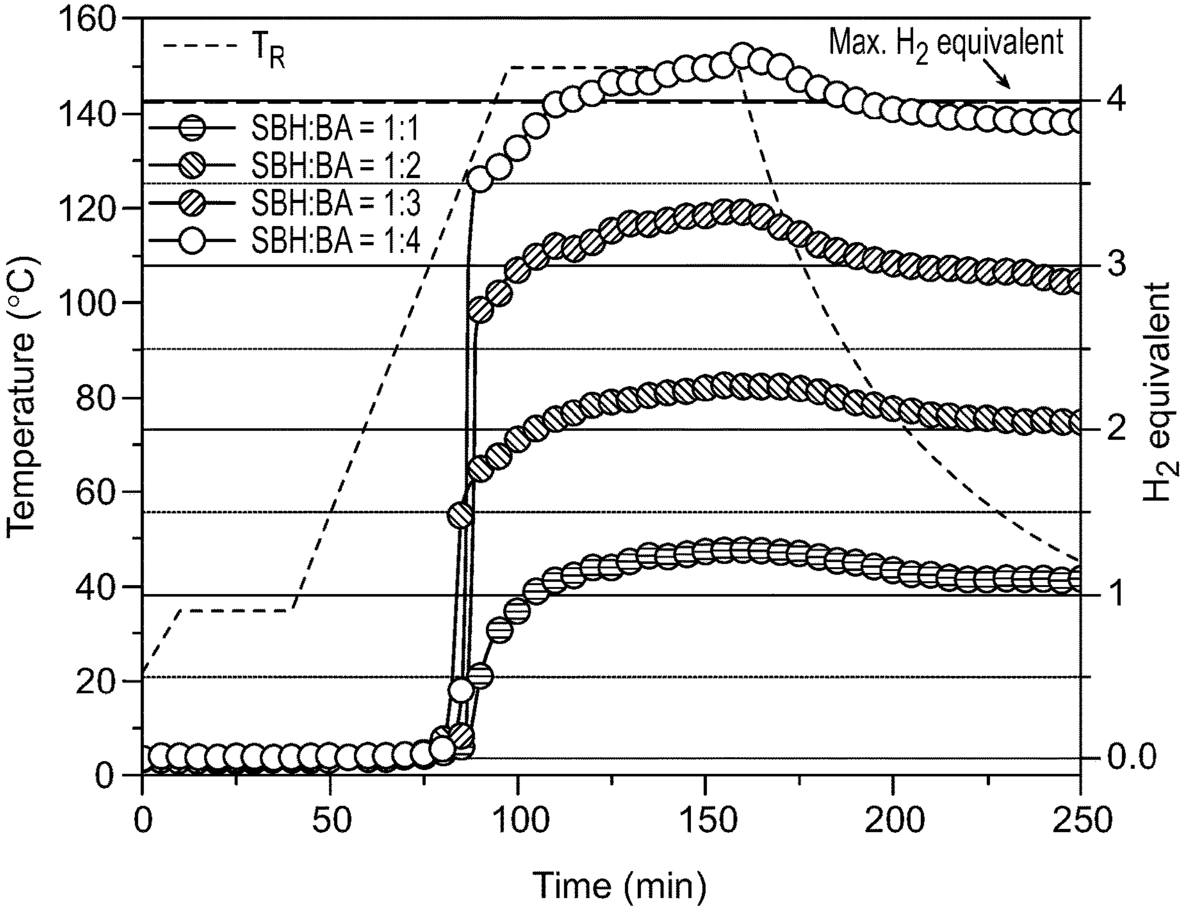
FIG. 4 is a graph illustrating the effect of SBH:BA molar ratio on $H_2$ equivalent at $T_{SP}$=150° C.

FIG. 4 shows the effect of molar ratio of SBH to BA on $H_2$ equivalent at $T_{SP}$ 150° C. With increasing BA portion in the mixture (or decreasing SBH/BA ratio), $H_2$ equivalent was proportionally increased. The $H_2$ equivalents were measured to be ~1.0, ~2.0, ~2.9, and ~3.9 for SBH/BA ratios of 1:1, 1:2, 1:3, and 1:4, respectively. These results agree that each BA releases 1 mol of $H_2O$ at $T_{SP}$ 150° C. and achieves 1$H_2$ equivalent by hydrolysis of SBH. Due to the exothermic heat produced by hydrolysis, the maximum sample temperature increased with BA contents in the sample. It was found that the sample temperature increased up to –200° C. for SBH:BA=1:4. As observed in FIG. 3, hydrogen was sharply evolved at –120° C., followed by a gradual increase. It is also interesting that the sharp $H_2$ evolution was observed at about the same temperature (–120° C.) for all the samples examined in this study.

The hydrolysis of SBH is commonly expressed as Eq. 2. Based on the results from FIGS. 1 and 2, however, Eq. 8 seems to be more acceptable for hydrolysis of SBH in our cases. Beaird et al. also suggested the same reaction scheme that solid NaBH4 produces hydrogen and sodium metaborate ($NaBO_2 \cdot xH_2O$) with a temperature-dependent hydrate state (x) when it contacts steam. When BA is used as a source of steam in this study, x is found to be 2 and Eq. 8 can be further expressed as Eq. 9.

$$NaBH_4+(2+x)H_2O \rightarrow NaBO_2 \cdot xH_2O+4H_2 \quad \text{(Eq. 8)}$$

$$NaBH_4+4H_2O \rightarrow NaB(OH)_4+4H_2 \quad \text{(Eq. 9)}$$

Figure 5:
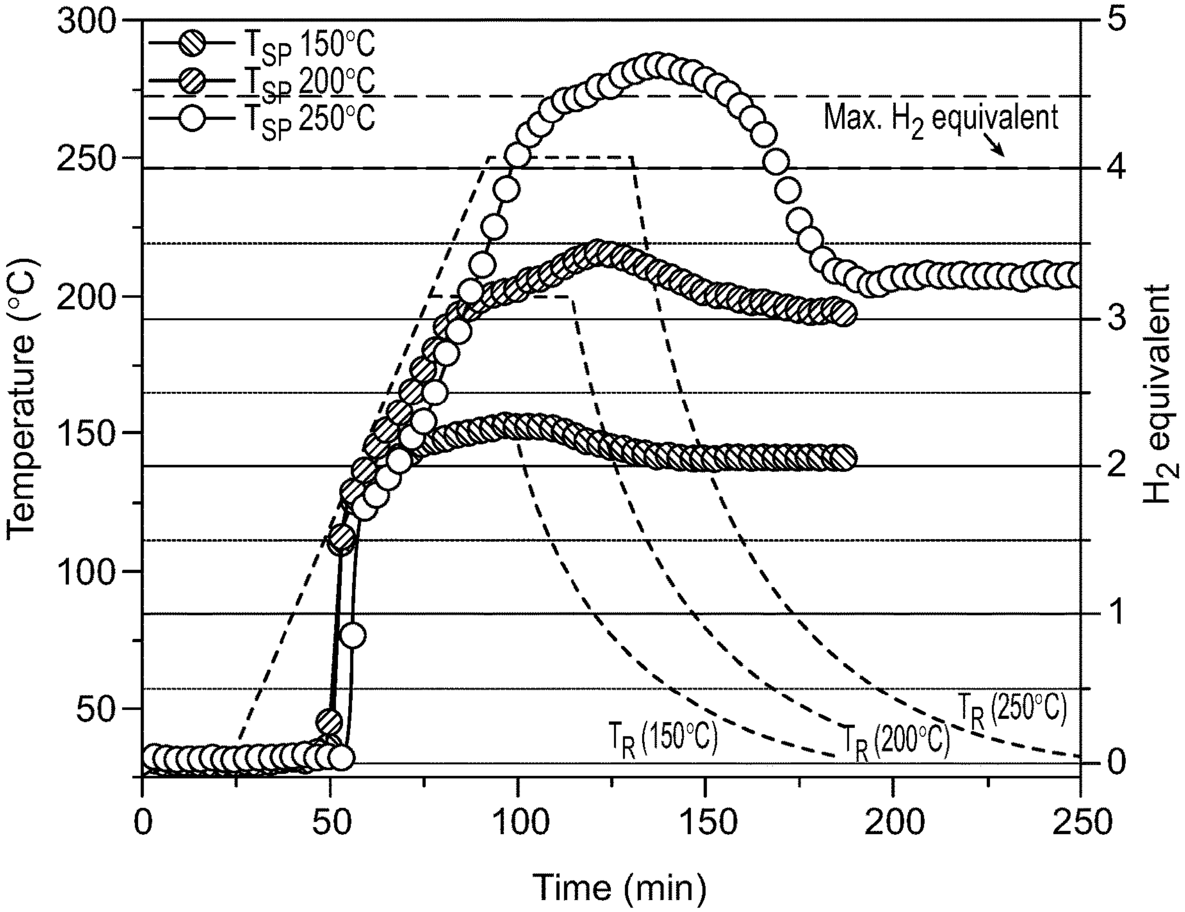
FIG. 5 is a graph illustrating the effect of set point temperature on $H_2$ equivalent for SBH:BA=1:2.

The hydrogen release properties were further investigated with varying set point temperature for SBH:BA=1:2. As shown in FIG. 5, it was found that $H_2$ equivalent increases with temperature. The $H_2$ equivalents were calculated to be 2.0, 3.05, and 3.3 for $T_{SP}$ 150, 200, and 250° C., respectively. At 150° C., BA is dehydrated to form metaboric acid (MBA) with a release of 1 mol $H_2O$ (Eq. 6). Additionally, 0.5 mol of water can be released from MBA with a further increase in temperature (Eq. 7), meaning that 1 mol of BA is decomposed to produce a total of 1.5 mol $H_2O$. As a result, –3$H_2$ equivalents were achieved for SBH:BA=1:2 at 200° C.

As the set point temperature increased to 250° C., $H_2$ equivalent further increased to 3.3. It is likely that at higher temperature (250° C.) sodium metaborate ($NaB(OH)_4$) existing as a dihydrate form ($NaBO_2 \cdot 2H_2O$, $SMB_{x=2}$) discharges water, which reacts with unreacted SBH to produce additional $H_2$ through hydrolysis. Thus, the decomposition of the BA supplements the hydrogen production from the hydrolysis of the SBH.

Marrero-Alfonso et al. studied dehydration properties of hydrated borates and reported that the dihydrate ($SMB_{x=2}$) is stable until about 100° C. and loses water through several sequential steps. The thermogravimetric analysis shows that $SMB_{x=2}$ loses approximately 26 (x≈1.47) and 30% (x≈1.70) mass at 175 and 275° C., respectively. Above 300° C., $SMB_{x=2}$ is completely dehydrated to form anhydrous borate ($NaBO_2$). This result explains why the $H_2$ equivalents calculated at set point temperature were higher than the final $H_2$ equivalents. As shown in FIG. 5, $H_2$ equivalents increase up to 2.3, 3.5 and 4.7 while maintaining the temperatures at $T_{SP}$ 150, 200, and 250° C. It is likely that some of the water discharged thermally from $SMB_{x=2}$ is consumed by hydrolysis to produce hydrogen, while the rest of the water not participating in hydrolysis is condensed in the reactor or hydrated back by cooling.

Figure 6:
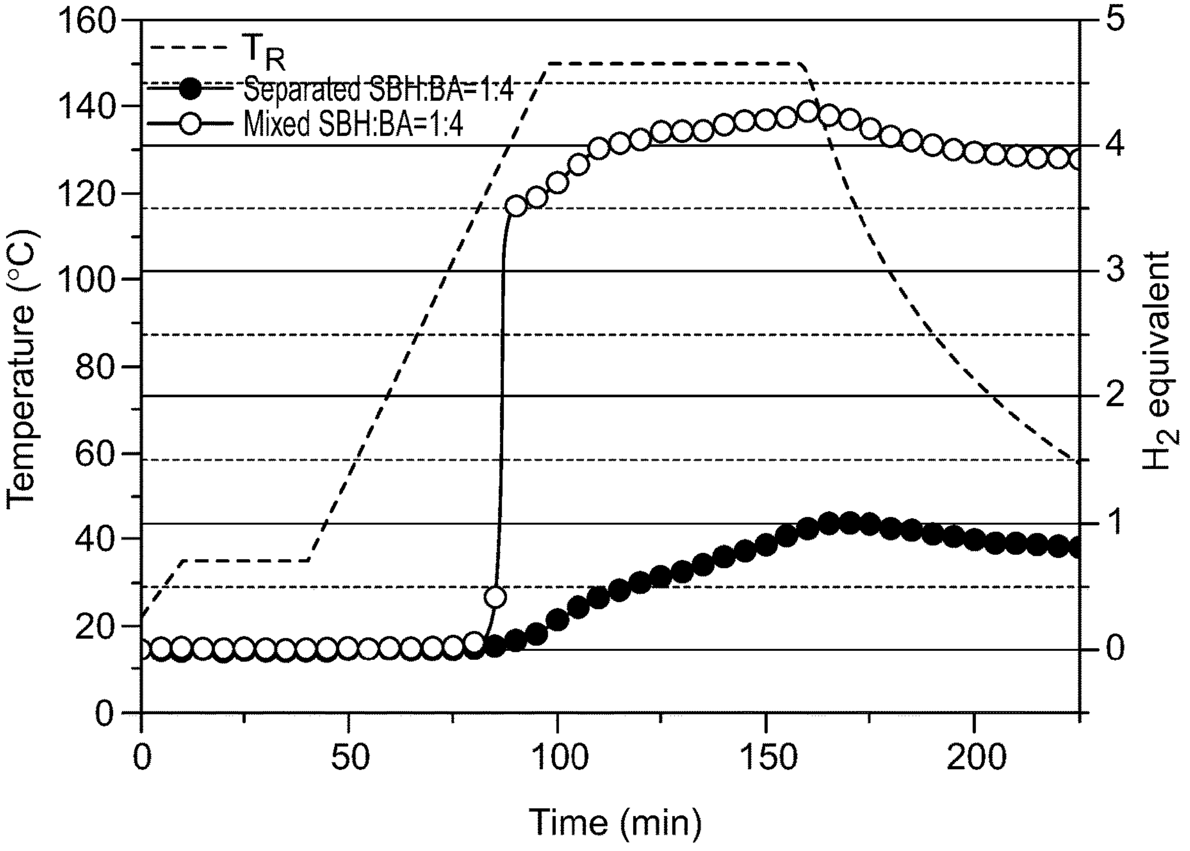
FIG. 6 is a graph illustrating the effect of sample configuration on $H_2$ equivalent at $T_{SP}$=150° C.

In the present work, rapid dehydrogenation rates were observed regardless of the reaction temperatures, while $H_2$ equivalent increased with increasing temperature. In addition, the hydrogen release rate was found to be significantly influenced by the dehydration rate of BA. To confirm the effects of contacts between reactants (SBH and BA), another experiment under the same operating conditions ($T_{SP}$ 150° C.) and sample composition (SBH:BA=1:4) was conducted, as shown in FIG. 6. In this case, SBH was separated with BA, which was placed at the bottom. This configuration allows water dehydrated from BA to move upward and reacts with SBH for hydrolysis. As already shown in FIGS. 3-5, sharp hydrogen evolution was obtained for the sample with uniform mixing, while $H_2$ equivalent gradually increased with time for the sample of SBH and BA separated from each other. Even at relatively high temperatures (>150° C.) in this study, it is likely that fast $H_2$ release kinetics are obtained because SBH and BA are in close contact and easier to hold the water released from BA. It is also noteworthy that a small fraction of the water released from BA is used for hydrolysis, while most appears to be held with dehydrated BA.

3. Characterization of Solid Products

Figure 7:
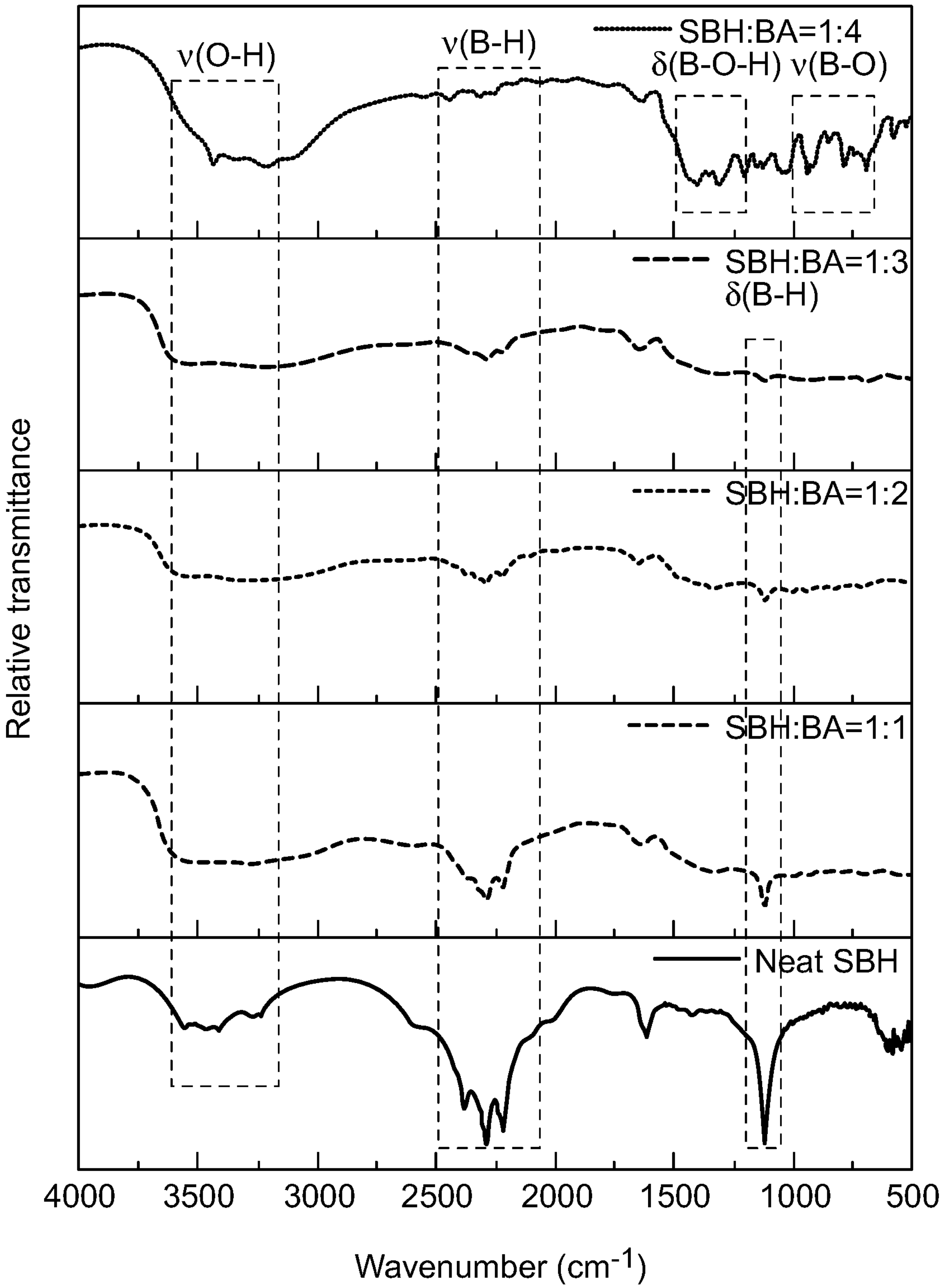
FIG. 7 is a graph of FT-IR spectra of neat SBH and solid products of different SBH/BA ratios after reaction at $T_{SP}$=150° C.
Figure 8A:
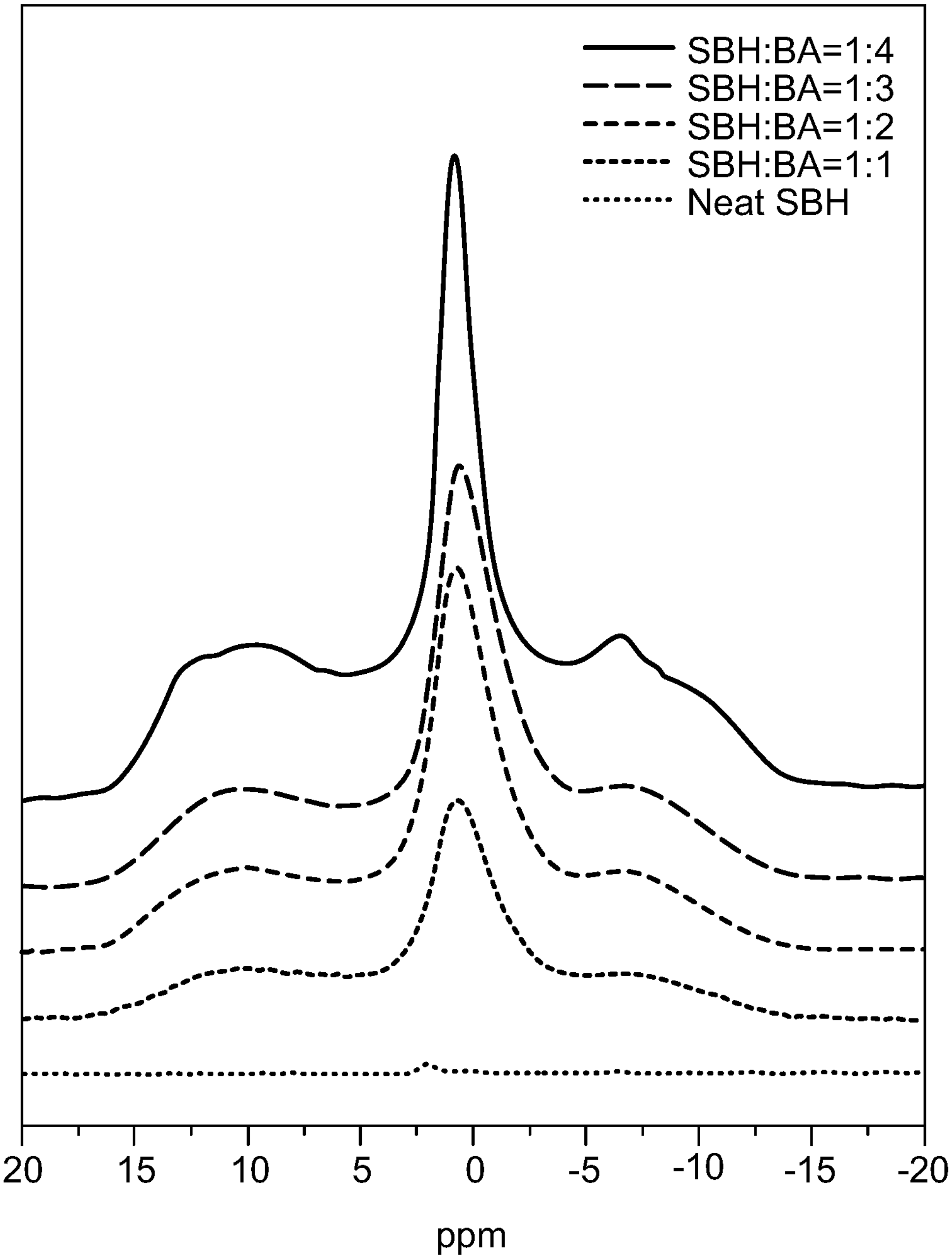
FIG. 8 is a graph illustrating $^{11}B$ solid-state NMR spectra (a) neat SBH and solid products of different SBH/BA ratios after reaction at $T_{SP}$=150° C. (b) neat $NaBO_2 \cdot 4H_2O$, and (c) BA before and after heating at $T_{SP}$=150° C.
Figure 8B:
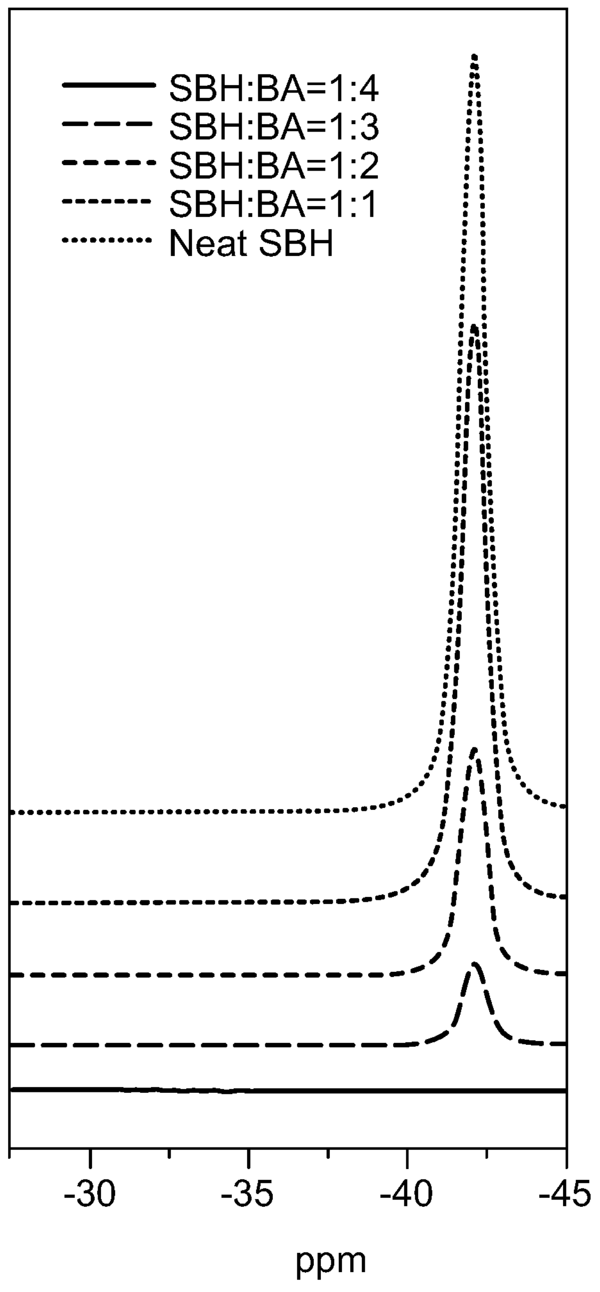
Figure 8C:
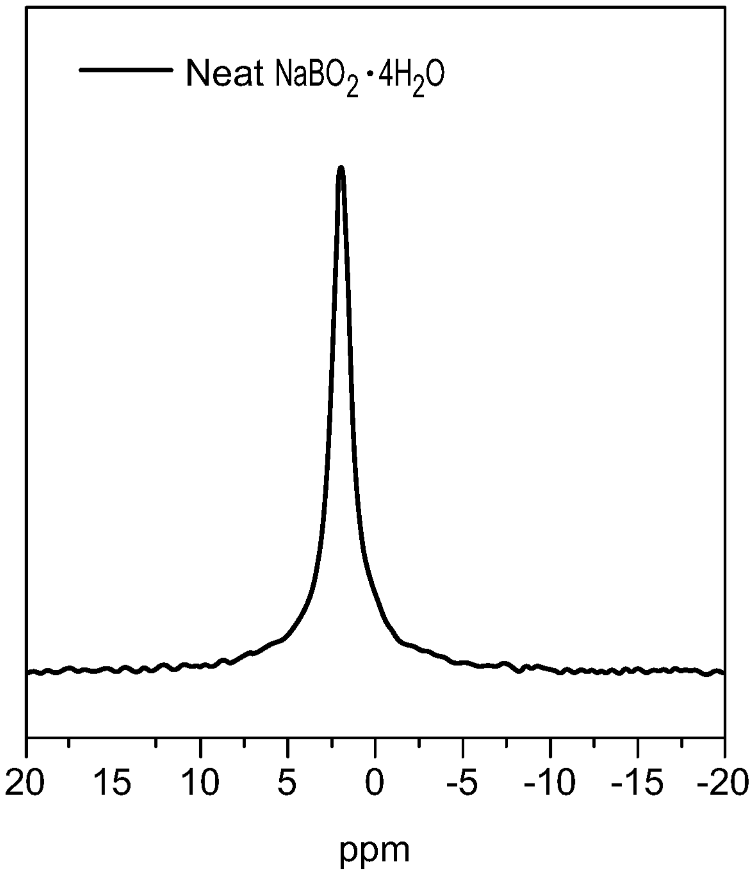
Figure 8D:
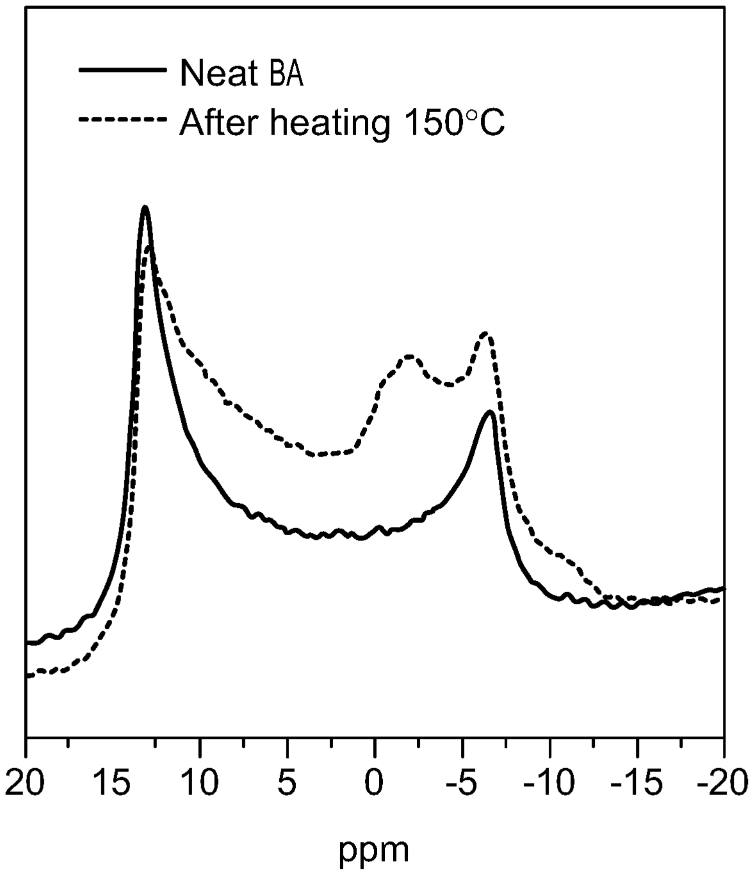

The solid products after hydrolysis of SBH in the presence of BA were characterized by FT-IR spectroscopy. FIG. 7 shows FT-IR profiles of neat SBH and solid products after the reaction of SBH-BA mixtures for different molar ratios. For the neat SBH, the absorption bands assigned to B-H stretching vibrations at 2382, 2289, and 2222 $cm^{-1}$ and a B-H bending vibration at 1121 $cm^{-1}$ were observed. As SBH/BA molar ratio increases, absorption bonds corresponding to B—H become weak and vanish for SBH:BA=1:4. In addition, B—O—H bending (1400-1200 $cm^{-1}$) and B—O stretching (900-600 $cm^{-1}$) related bands assigned to $HBO_2$, $B_2O_3$ and $NaBO_2$ appear, while the B-H stretching and bending bonds disappear, indicating that SBH is completely hydrolyzed to form $NaBO \cdot xH_2O$. These results are in good agreement with $H_2$ equivalents observed in FIG. 4.

The solid products examined above were further characterized by solid-state 11B NMR. The peaks corresponding to $[B(OH)_4]$— and $[BH_4]$— are generally observed at near 0 and –42.2 ppm, respectively. FIG. 8 shows that with decreasing SBH/BA ratio, a peak corresponding to $[B(OH)_4]$— at 0 ppm increases, while a peak for $[BH_4]$— at –42.2 ppm decreases. This result agrees that as BA portion in the mixture increases, more SBH is consumed to produce more hydrogen, as observed in FIG. 4. It can be clearly seen that the peak assigned to SBH completely disappears for SBH:BA=1:4, which is in good agreement with the results obtained from FT-IR analysis above. Relatively broad shoulder peaks observed over 15-5 and −5-−15 ppm are ascribed to boric acid. In this NMR characterization, any distinct peaks related to intermediate species such as $[BH(OH)_3]$, $[BH_2(OH)_2]$, and $[BH_3(OH)]$ were not observed.

Figure 9:
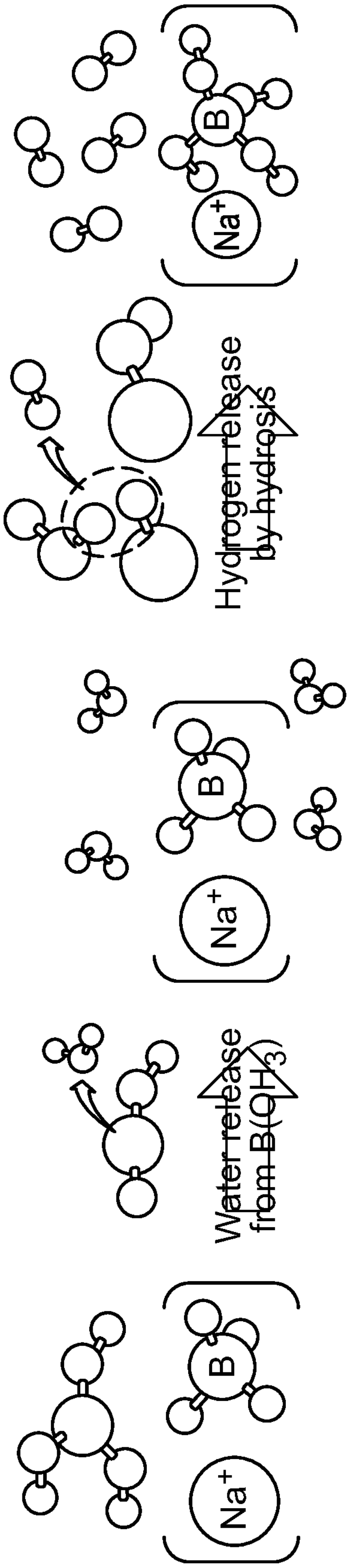
FIG. 9 is a graph illustrating the mechanism of thermal hydrolysis of SBH with BA.

Based on the results from hydrogen release kinetics and characterization of SBH spent products, the reaction scheme of thermal hydrolysis of SBH in the presence of BA is proposed, as shown in FIG. 9.

B. Conclusion

In this study, we first propose thermal hydrolysis of sodium borohydride (SBH, NaBH4) with boric acid ($B(OH)_3$, (BA) as a steam source. As presented in FIG. 9, SBH generates hydrogen by hydrolysis with water dehydrated by thermal decomposition of BA. As compared to conventional hydrolysis, this approach offers improved safety and higher $H_2$ yield since the SBH-BA mixture is stable at normal conditions (i.e. below about 60° C.) and excess water is not required. In addition, the operating temperature of this approach is much lower than those for conventional thermolysis. Table 1 summarizes the results of $H_2$ equivalent and yield at different conditions investigated in the present work.

TABLE 1

Hydrogen equivalents and yield for different SBH-BA ratios and temperatures

| Sample | SBH1:BA1 | SBH1:BA2 | SBH1:BA3 | SBH1:BA4 | SBH1:BA2 | SBH1:BA2 |
|---|---|---|---|---|---|---|
| Set temperature (° C.) | 150 | 150 | 150 | 150 | 200 | 250 |
| $H_2$ equivalent | 1.08 | 2.05 | 2.91 | 3.9 | 3.03 | 3.27 |
| $H_2$ yield (wt. %) based on SBH only | 5.64 | 10.56 | 15.02 | 20.06 | 15.61 | 16.86 |
| Overall $H_2$ yield (wt. %) | 2.12 | 2.47 | 2.54 | 2.66 | 3.66 | 3.95 |

Using this new method, we obtained $3.9H_2$ equivalent along with a rapid hydrogen release kinetics at 150° C. for SBH:BA=1:4. In addition, the maximum overall $H_2$ yields were 2.66, 3.66 and 3.95 wt. % at 150, 200, and 250° C., respectively. Sodium metaborate ($NaBO_2 \cdot 2H_2O$) was identified as a main product by hydrolysis of SBH. It was also found that $H_2$ yield can be further improved by utilizing water discharged from the sodium metaborate in dihydrate form, suggesting that various hydrates can be used as steam sources for thermal hydrolysis approach as well. The results suggest that the hydrogen storage approach described in this work is promising for proton exchange membrane fuel cell applications.

This disclosure may be considered to relate to the following items.

1. A solid state formulation adapted for hydrogen generation, comprising:

a mixture of (a) sodium borohydride and (b) a water storage agent that is stable at temperatures below about 60° C. but adapted to release water upon heating to a temperature between about 80° C. and about 300° C.

2. The solid state formulation of item 1, wherein a molar ratio of sodium borohydride to water storage agent is between about 1:1 and about 1:10.

3. The solid state formulation of either of item 1 or item 2, wherein the water storage agent is adapted to release water upon heating to a temperature between about 80° C. and about 250° C.

4. The solid state formulation of either of item 1 or item 2, wherein the water storage agent is adapted to release water upon heating to a temperature between about 80° C. and about 200° C.

5. The solid state formulation of either of item 1 or item 2, wherein the water storage agent is adapted to release water upon heating to a temperature between about 80° C. and about 150° C.

6. The solid state formulation of either of item 1 or item 2, wherein the water storage agent is selected from a group of agents consisting of boric acid, a hydrated inorganic compound, a water absorbent and combinations thereof 7. The solid state formulation of item 1, wherein the molar ratio of sodium borohydride to water storage agent is between about 1:1 and about 1:5.

8. The solid state formulation of item 7, wherein the water storage agent is adapted to release water upon heating to a temperature between about 80° C. and about 250° C.

9. The solid state formulation of item 7, wherein the water storage agent is adapted to release water upon heating to a temperature between about 80° C. and about 200° C.

10. The solid state formulation of item 7, wherein the water storage agent is adapted to release water upon heating to a temperature between about 80° C. and about 150° C.

11. The solid state formulation of any of items 1, 2 or 7, wherein the water storage agent is selected from a group of agents consisting of boric acid, a hydrated inorganic compound, a water absorbent and combinations thereof 12. A method of generating hydrogen, comprising:

heating a mixture of sodium borohydride and a water storage agent to a temperature of between about 80° C. and about 300° C. to release water from the water storage agent and generate hydrogen from the sodium borohydride.

13. The method of item 12, wherein the heating is to a temperature between about 80° C. and about 250° C.

14. The method of item 12, wherein the heating is to a temperature of between about 80° C. and about 200° C.

15. The method of item 12, wherein the heating is to a temperature between about 80° C. and about 150° C.

16. The method of item 12, including using boric acid, a hydrated inorganic compound, a water absorbent and combinations thereof as the water storage agent.

17. A method of generating hydrogen, comprising:

heating a solid state formulation, including sodium borohydride, to a temperature of between about 80° C. and about 150° C. to generate a hydrogen yield of between about 10 wt % and about 13 wt %.

18. The method of item 17, wherein the solid state formulation further includes a water storage agent that is stable below about 60° C. and the solid state formulation has a molar ratio of sodium borohydride to water storage agent of between about 1:1 and about 1:10.
19. The method of item 17, wherein the solid state formulation further includes a water storage agent that is stable below about 60° C. and the solid state formulation has a molar ratio of sodium borohydride to water storage agent of between about 1:1 and about 1:5.
20. The method of any of items 17-19, wherein the water storage agent is boric acid.
21. A method of generating hydrogen by thermal hydrolysis, comprising: heating a mixture of sodium borohydride and boric acid to a temperature between about 80° C. and about 200° C.

Each of the following terms written in singular grammatical form: "a", "an", and the", as used herein, means "at least one", or "one or more". Use of the phrase "One or more" herein does not alter this intended meaning of "a", "an", or "the". Accordingly, the terms "a", "an", and "the", as used herein, may also refer to, and encompass, a plurality of the stated entity or object, unless otherwise specifically defined or stated herein, or, unless the context clearly dictates otherwise. For example, the phrases: "a water storage agent", "a device", "an assembly", "a mechanism", "a component, "an element", and "a step or procedure", as used herein, may also refer to, and encompass, a plurality of water storage agents, a plurality of devices, a plurality of assemblies, a plurality of mechanisms, a plurality of components, a plurality of elements, and, a plurality of steps or procedures, respectively.

Each of the following terms: "includes", "including", "has", "having", "comprises", and "comprising", and, their linguistic/grammatical variants, derivatives, or/and conjugates, as used herein, means "including, but not limited to", and is to be taken as specifying the stated component(s), feature(s), characteristic(s), parameter(s), integer(s), or step(s), and does not preclude addition of one or more additional component(s), feature(s), characteristic(s), parameter(s), integer(s), step(s), or groups thereof.

The phrase "consisting of", as used herein, is closed-ended and excludes any element, step, or ingredient not specifically mentioned. The phrase "consisting essentially of", as used herein, is a semi-closed term indicating that an item is limited to the components specified and those that do not materially affect the basic and novel characteristic(s) of what is specified.

Terms of approximation, such as the terms about, substantially, approximately, etc., as used herein, refers to ±10% of the stated numerical value.

It is to be fully understood that certain aspects, characteristics, and features, of the solid state formulation and the related method of generating hydrogen, which are, for clarity, illustratively described and presented in the context or format of a plurality of separate embodiments, may also be illustratively described and presented in any suitable combination or sub-combination in the context or format of a single embodiment. Conversely, various aspects, characteristics, and features, of the solid state formulation and the related method of generating hydrogen which are illustratively described and presented in combination or sub-combination in the context or format of a single embodiment may also be illustratively described and presented in the context or format of a plurality of separate embodiments.

Although the solid state formulation and the related method of generating hydrogen of this disclosure have been illustratively described and presented by way of specific exemplary embodiments, and examples thereof, it is evident that many alternatives, modifications, or/and variations, thereof, will be apparent to those skilled in the art. Accordingly, it is intended that all such alternatives, modifications, or/and variations, fall within the spirit of, and are encompassed by, the broad scope of the appended claims.

What is claimed:

1. A solid state formulation for hydrogen generation, comprising:

a mixture of (a) sodium borohydride and (b) boric acid that is stable at temperatures below about 60° C. but releases water upon heating to a temperature between about 80° C. and about 300° C. wherein a molar ratio of sodium borohydride to boric acid is between about 1:1 and about 1:10.

2. The solid state formulation of claim 1, wherein the boric acid releases water upon heating to a temperature between about 80° C. and about 250° C.

3. The solid state formulation of claim 1, wherein the boric acid releases water upon heating to a temperature between about 80° C. and about 200° C.

4. The solid state formulation of claim 1, wherein the boric acid releases water upon heating to a temperature between about 80° C. and about 150° C.

5. The solid state formulation of claim 1, wherein the molar ratio of sodium borohydride to boric acid is between about 1:1 and about 1:5.

6. The solid state formulation of claim 5, wherein the boric acid releases water upon heating to a temperature between about 80° C. and about 250° C.

7. The solid state formulation of claim 5, wherein the boric acid releases water upon heating to a temperature between about 80° C. and about 200° C.

8. The solid state formulation of claim 5, wherein the boric acid releases water upon heating to a temperature between about 80° C. and about 150° C.

9. A solid state formulation for hydrogen generation, comprising a mixture of sodium borohydride and boric acid that is stable at temperatures below about 60° wherein a molar ratio of sodium borohydride to boric acid is between about 1:1 and about 1:10.

* * * * *